United States Patent
Hsu et al.

(10) Patent No.: US 9,557,863 B2
(45) Date of Patent: Jan. 31, 2017

(54) TOUCH PANEL AND METHOD FOR FABRICATING THE SAME

(71) Applicant: TPK Touch Solutions (Xiamen) Inc., Xiamen (CN)

(72) Inventors: I-Chung Hsu, Taoyuan (TW); Chunyong Zhang, Xiamen (CN); Lichun Yang, Xiamen (CN); Kuo-Shu Hsu, Xinbei (TW); Yuan-Jen Shih, Taichung (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 102 days.

(21) Appl. No.: 14/256,987

(22) Filed: Apr. 20, 2014

(65) Prior Publication Data

US 2014/0313440 A1 Oct. 23, 2014

(30) Foreign Application Priority Data

Apr. 20, 2013 (CN) .......................... 2013 1 0139527

(51) Int. Cl.
 *G06F 3/041* (2006.01)
 *G06F 3/044* (2006.01)
(52) U.S. Cl.
 CPC ..... *G06F 3/044* (2013.01); *G06F 2203/04103* (2013.01); *G06F 2203/04107* (2013.01); *Y10T 29/49002* (2015.01)
(58) Field of Classification Search
 CPC G06F 3/044; G06F 3/047; G06F 2203/04103; G06F 2203/04107
 See application file for complete search history.

(56) References Cited

U.S. PATENT DOCUMENTS

| | | | | |
|---|---|---|---|---|
| 2010/0200539 | A1* | 8/2010 | Yun | B23K 26/4065 216/13 |
| 2011/0169783 | A1* | 7/2011 | Wang | G06F 3/0412 345/176 |
| 2011/0234507 | A1* | 9/2011 | Chou | G06F 3/044 345/173 |
| 2013/0107246 | A1* | 5/2013 | Yang | G02B 5/208 356/51 |
| 2014/0078098 | A1* | 3/2014 | Kim | G06F 3/041 345/174 |
| 2014/0145971 | A1* | 5/2014 | Lin | G06F 3/044 345/173 |

FOREIGN PATENT DOCUMENTS

KR 1020100104463 * 9/2010

* cited by examiner

*Primary Examiner* — Ilana Spar
*Assistant Examiner* — Kirk Hermann
(74) *Attorney, Agent, or Firm* — Cooper Legal Group, LLC (57) ABSTRACT

The present disclosure provides a touch panel, including: a cover lens, an optical compensation layer and a sensing electrode layer disposed between the cover lens and the optical compensation layer, wherein an etching region and a non-etching region are defined in the sensing electrode layer; an optical match is formed by the optical compensation layer with the sensing electrode layer, wherein the optical compensation layer receives incident light through the cover lens and the sensing electrode to reconcile the hue of the reflected light correspondingly formed from the etching region and the non-etching region. The present disclosure also provides a method for fabricating a touch panel.

22 Claims, 7 Drawing Sheets

TOUCH PANEL AND METHOD FOR FABRICATING THE SAME

BACKGROUND OF THE INVENTION

The present invention claims the priority of China Patent Application No. 201310139527.8 filed on Apr. 20, 2013, which is incorporated by reference in the present application in its entirety.

FIELD OF THE INVENTION

The present invention relates to touch technology, and in particular to a touch panel and method for fabricating the same.

DESCRIPTION OF THE RELATED ART

Touch panels have been widely applied to electronic products, such as household electronic, communication devices and information technology (IT) devices, and have gradually superseded physicals keyboards, mice, and so forth, as the input interface in different electronic products that provides a sufficient operation interface.

The touch panels of the present day have been developed into a touch-on-lens (TOL) structure having the sensing electrode formed on the protective cover lens. Although these TOL touch panels are slim and light, if the sensing electrode is an etched pattern, optical problems such as chromatic aberration appear from the touch panel to the observer. This is because the etching region and the non-etching region of the sensing electrode respond differently to light.

BRIEF SUMMARY OF THE INVENTION

The embodiments of the disclosure further design an optical compensation layer to match with the sensing electrode. Chromatic aberration of the touch panel can be effectively improved.

An embodiment of the disclosure provides a touch panel, comprising: a cover lens; an optical compensation layer; and a sensing electrode layer between the cover lens and the optical compensation layer, wherein an etching region and a non-etching region are defined in the sensing electrode layer; wherein an optical match is formed by the optical compensation layer with the sensing electrode layer, and wherein the optical compensation layer receives incident light through the cover lens and the sensing electrode to reconcile the hue of the reflected light correspondingly formed from the etching region and the non-etching region.

Another embodiment of the disclosure provides a method for forming a touch panel, comprising: forming a sensing electrode layer and an optical compensation layer subsequently at a side of a cover lens, wherein the sensing electrode layer is disposed between the cover lens and the optical compensation layer, wherein an etching region and a non-etching region are defined in the sensing electrode layer; and wherein an optical match is formed by the optical compensation layer with the sensing electrode layer, and wherein the optical compensation layer receives incident light through the cover lens and the sensing electrode to reconcile the hue of the reflected light correspondingly formed from the etching region and the non-etching region.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Moreover, in the descriptions that follow, the orientations of a first feature "on", "above", "under" or "below" a second feature may refer to the first and the second features being in direct contact, or additional features being disposed between the first and second features such that the first and second features are not in direct contact. In addition, the orientations "on" and "under" are only used for representing the relationship between the relative positions of each element. In the figures of the disclosure, the top of the touch panels is close to the observer and the bottom of the touch panel is far away from the observer. Furthermore, various features are not drawn to scale to simplify and clarify the figures.

Referring to FIGS. 1A-4, the structures of various touch panels (200, 300, 400, and 500) are illustrated. In general, each of the touch panels (200, 300, 400 and 500) includes a cover lens (202, 302, 402 and 502), an optical compensation layer (208, 308, 408 and 508) and a sensing electrode layer (206, 306, 406 and 506), wherein the sensing electrode layer is disposed between the cover lens and the optical compensation layer. An etching region (the region composed of sensing elements) and a non-etching region (the non-touching region sandwiched between the sensing elements) are defined on the sensing electrode layer. The optical compensation layer is utilized to form an optical match with the sensing electrode layer. The optical compensation layer receives incident light which passes through the cover lens and the sensing electrode layer to reconcile the hue of the corresponding reflected light formed by the etched and the non-etching region.

A detailed description of the structure of each touch panel in accordance with the figures is given in the following.

Figure 1A:
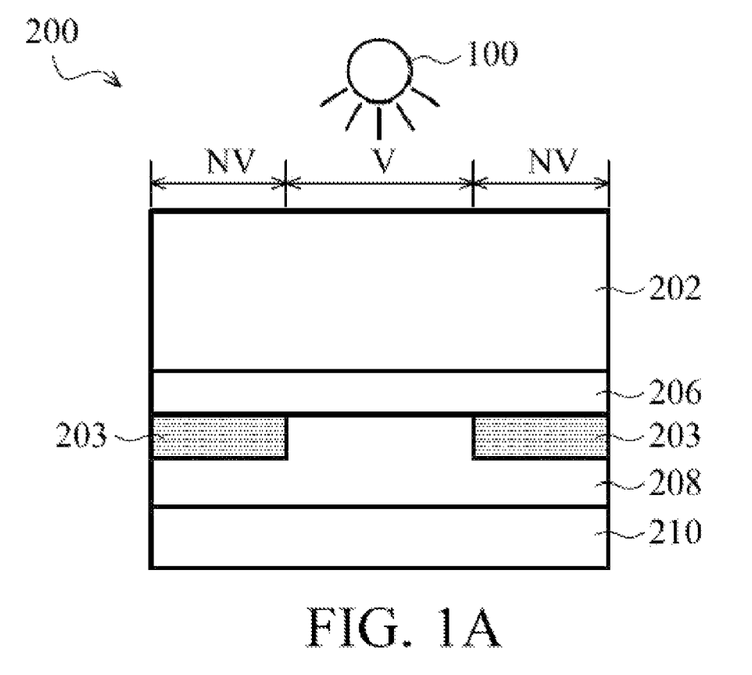
FIG. 1A illustrates a cross-sectional view of a touch panel in accordance with an embodiment.
Figure 1B:
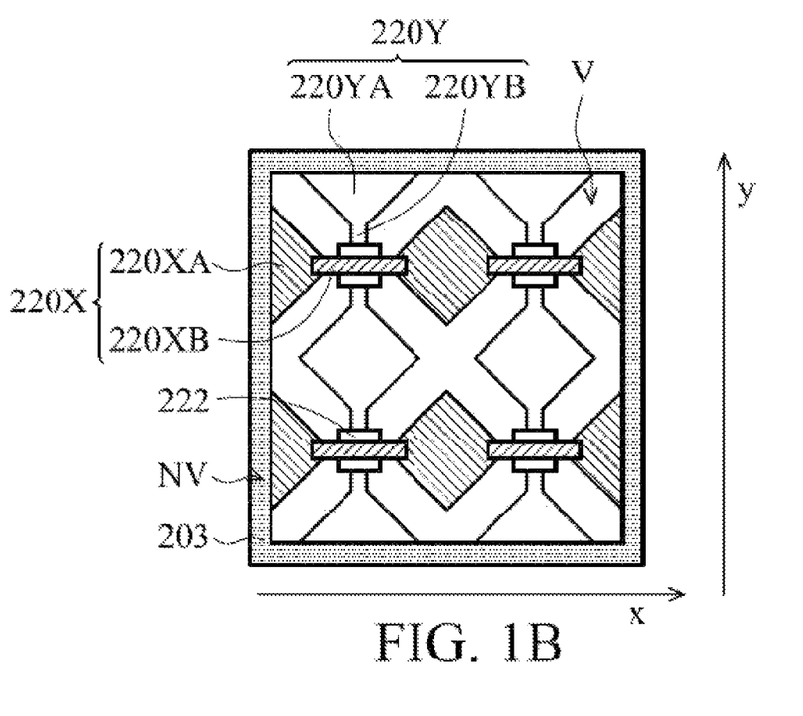
FIG. 1B illustrates a top view of a touch panel in accordance with an embodiment.

FIGS. 1A and 1B respectively illustrate a cross-sectional view and a top view of a touch panel in accordance with an embodiment. As shown in FIG. 1A, the touch panel 200 of the embodiment includes a cover lens 202, a sensing electrode layer 206 and an optical compensation layer 208. The cover lens 202 may be a strengthened cover lens. Apart from supporting the sensing electrode layer 206, the strengthened cover lens further provides a tough protection. In one embodiment, the strengthened cover lens may be formed by a chemical ion exchange process or similar processes. In an embodiment, cover lens 202 is formed by a transparent plate, for example, plastic materials of glass or polymer. In other embodiments, the cover lens may be formed by thermoplastic materials such as acrylic resin. In addition, the thickness of the cover lens 202 may be about 0.2 -2.0 mm.

The sensing electrode layer 206 is disposed at one side of the cover lens 202 and between the cover lens 202 and the optical compensation layer 208. In the embodiment, the sensing electrode layer 206 is formed at the bottom surface of the cover lens 202. As shown in FIG. 1B, sensing elements are formed by patterning the sensing electrode layer 206. The sensing elements substantially include a plurality of first electrodes 220X along a first axis (for example, the x-axis), and a plurality of second electrodes 220Y along a second axis (for example, the y-axis). Each first electrode 220X includes a plurality of first conductive units 220XA and a plurality of first connecting wires 220XB, wherein every two adjacent first conductive units 220XA are connected and electrically coupled to each other by a first connecting wire 220XB along the first axis. Each second electrode 220Y includes a plurality of second conductive units 220YA and a plurality of second connecting wires 220YB, wherein every two adjacent second conductive units 220YA are connected and electrically coupled to each other by a second connecting wire 220YB along the second axis. Moreover, the first connecting wire and the second connecting wire are crisscrossed. In an embodiment, the sensing elements further include insulating layers 222 disposed between the crisscrossed first and second connecting wires 220XB and 220YB to provide electric insulation between the first and second connecting wires 220XB and 220YB.

The processes for forming the sensing electrode 206 may include, for example, depositing a transparent conductive material (such as indium tin oxide, (ITO)) by coating, sputtering, or the like, and then patterning the transparent conductive material by a lithography process, an etch process, or the like, to form the desired sensing electrode 206. In addition, the sensing electrode layer 206 may also be directly formed by, for example, a screen printing process. The etching region mentioned above is a region consisting of the first electrodes 220X, the second electrode 220Y and the insulating layers 222, and the non-etching region is a non-touching region between the first electrodes 220X, the second electrode 220Y and the insulating layers 222. However, the sensing electrode layer is not limited to the pattern structure shown in FIG. 1B.

The touch panel 200 may further include an optical compensation layer 208 formed over the bottom surface of the sensing electrode layer 206. The optical compensation layer 208 is utilized to form an optical match with the sensing electrode layer 206 to receive incident light through the cover lens 202 and the sensing electrode layer 202 to reconcile the hue of the corresponding reflected light formed by the etched and the non-etching region. As a result, the compensation layer 208 can compensate for the reflectivity difference between the etched and non-etching region in the sensing electrode layer 206 that is caused by the patterning process, and reduce the value of the reflectivity difference of the etched and non-etching regions under a light with a high low-band wavelength, thereby effectively tuning the color tone of the reflective light reflected by the touch panel 200 facing an external light source 100 into a color tone similar to natural light without tending to be blue or yellow.

It should be noted that, in one embodiment, the optical compensation layer 208 may be a single layer or a composite layer consisting of multiple layers. The optical compensation layer 208 may be formed of a material such as glass, $Nb_2O_5$, $SiO_2$, ITO, $TiO_2$, or a combination thereof. In some embodiments, the optical compensation layer 208 is a composite layer consisting of multiple layers, wherein the composite layer is formed by alternating a plurality of high-refractivity layers and low-refractivity layers. In other embodiments, the optical compensation layer 208 is a double-layered composite layer formed by stacking a first compensation layer and a second compensation layer, wherein the first compensation layer is a $SiO_2$ layer and the second compensation layer is an $Nb_2O_5$ layer. The thickness of the first compensation layer is about 5-60 nm and the refractivity of the first compensation layer is 1.20-1.70. The thickness of the second compensation layer is about 1-15 nm and the refractivity of the second compensation layer is 1.6-2.5. In addition, the process parameters of the optical compensation layer 208 in actual design may be adjusted in accordance with the optical properties (for example, refractivity) of the sensing electrode layer 206 and the desired color tone of the reflective light. The method for forming the optical compensation layer 208 may include radio frequency sputtering, vapor deposition, spray coating, spin coating, or brush coating.

In an embodiment, the touch panel 200 may further include a shielding element 203, the area formed by the shielding element 203 defines a non-visible region NV of the touch panel 200, which covers the non-transparent elements (not shown), such as peripheral circuits, corresponding to the non-visible region NV in the touch panel 200. The region other than the non-visible region of the touch panel 200 is defined as the visible region V. In the structure of the touch panel 200, the non-visible region NV is generally designed to be situated at at least a peripheral region of the visible region V. In an embodiment, the shielding element 203 may be disposed between the sensing electrode layer 206 and the optical compensation layer 208 in the non-visible region NV, in particular formed on the bottom surface of the sensing electrode layer 206 in the non-visible region NV. As a result, the actual position of the optical compensation layer 208 in the visible region V is located at the bottom surface of the sensing electrode layer 206, and the actual position of the optical compensation layer 208 in the non-visible region NV is located at the bottom surface of the shielding element 203.

The shielding element 203 may be formed of a light shading material with an optical density less than 7 such as, insulating ink, carbon slurry, graphite flake, or a combination thereof. The shielding element 203 may be formed by printing or coating. According to the appearance of the touch panel 200, the insulating ink of the shielding element 203 may be chosen to be in black, brown, or any other color, such that the appearance of the non-visible region NV of the touch panel 200 is presented in black, brown, or any other color.

The touch panel 200 of the embodiment also includes a passivation layer 210 formed over the bottom surface of the optical compensation layer 208 to further protect the sensing electrode layer 206 from unexpected influence to the touch sensing effect caused by the external chemical reaction or physical change. The passivation layer 210 may be formed of transparent plastic materials, such as polyethylene terephthalate (PET). In some embodiments, the method of forming the passivation layer 210 may include radio frequency sputtering, vapor deposition, spray coating, spin coating, or brush coating.

According to the above description, the design of the optical compensation layer 208 can effectively improve the chromatic aberration of the touch panel 200, thereby increasing the transmittance of the visible region V of the touch panel 200 once the above problems are solved.

Figure 2:
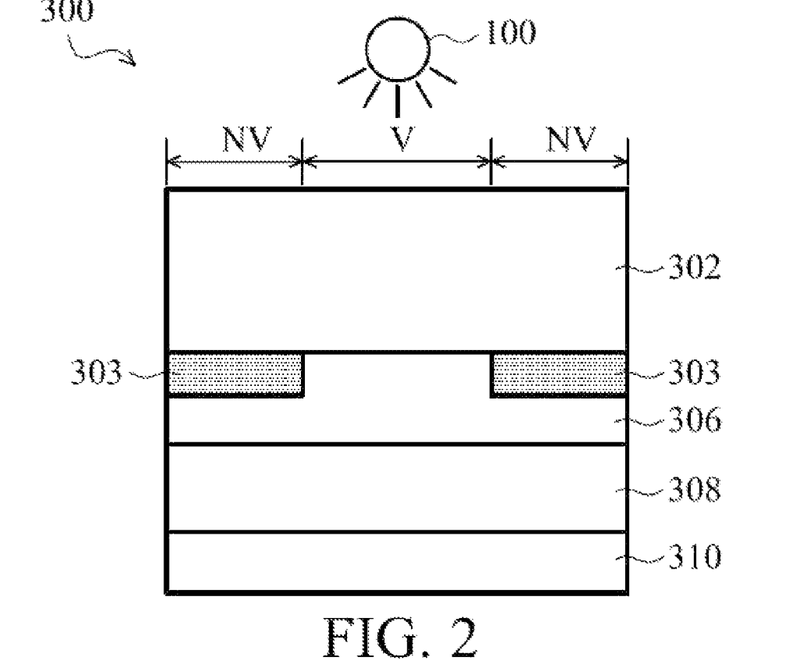
FIG. 2 illustrates a cross-sectional view of a touch panel in accordance with another embodiment.

Referring to FIG. 2, a cross-sectional view of a touch panel is illustrated in accordance with another embodiment. The touch panel 300 of the embodiment is substantially similar to the structure of the embodiment in FIG. 1A, except that the shielding element 303 may be disposed between the cover lens 302 and the sensing electrode layer 306 in the non-visible region NV, and in particular disposed over the bottom surface of the cover lens in the non-visible region NV.

Figure 3:
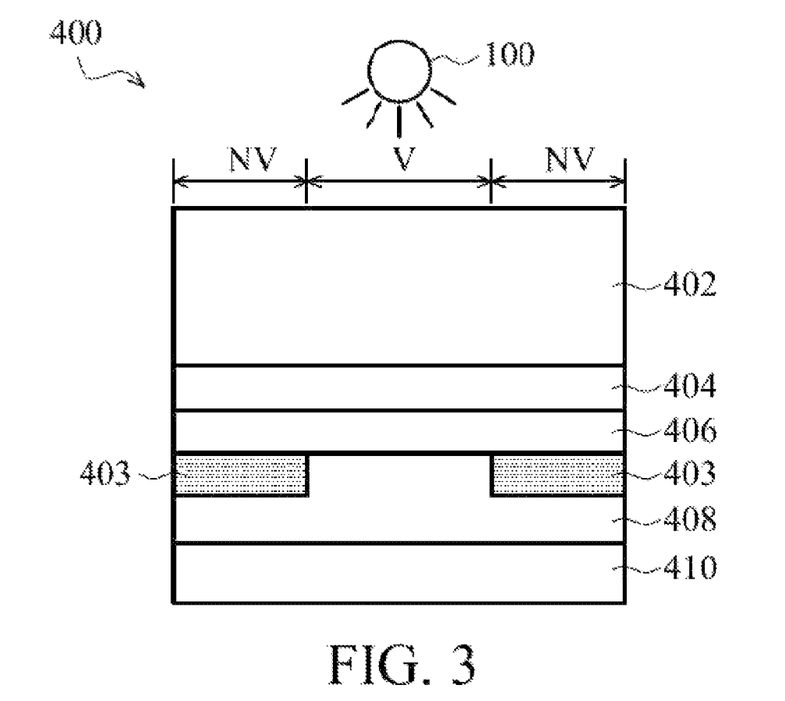
FIG. 3 illustrates a cross-sectional view of a touch panel in accordance with yet another embodiment

Referring to FIG. 3, a cross-sectional view of a touch panel is illustrated in accordance with yet another embodiment. In this embodiment, the structure constituted by the sensing electrode layer 406, the optical compensation layer 408 and the passivation layer 410 is substantially similar to the embodiment of FIG. 1A, except that the touch panel 400 of the embodiment further includes an index-matching layer 404, which is disposed at the same side of the cover lens 402 with the above-mentioned layers. The index-matching layer 404 and the optical compensation layer 408 is symmetrically disposed on two opposite sides of the sensing electrode layer 406, and in particular the index-matching layer 404 is disposed between the cover lens 302 and the sensing electrode 306. The formation sequence is that the index-matching layer 404 is formed over the bottom surface of the cover lens 402 before the formation of the sensing electrode layer 406. In other words, the sensing electrode layer 406 of the embodiment is formed over the bottom surface of the index-matching layer 404. The design of the optical compensation layer 408 in the embodiment can further form an optical match with the index-matching layer 404 and the sensing electrode layer 406 in accordance with the optical properties of the index-matching layer 404 and the sensing electrode layer 406.

Additionally, the thickness of the sensing electrode layer 406 is generally designed according to actual design requirements. For example, in a large-scale touch panel, the thickness of the sensing electrode layer 406 is accordingly designed to be thicker to meet the requirement of lower wire resistance. As a result, the etch lines caused by the patterning of the sensing electrode layer 406 become more obviously visible. Accordingly, the embodiment conceals the etch lines through the addition of an index-matching layer 404 before the formation of the sensing electrode layer 406 and the subsequently formed layers. In the embodiment, the index-matching layer 404 is a type of anti-reflection layer, which is utilized to avoid the visibility of the etch lines, and does not provide the function of adjusting the color of the reflected light reflected by the external light source 100 facing the touch panel 400 as the optical compensation layer does. In addition, the index-matching layer 404 may be formed of $Nb_2O_5$ or $SiO_2$, and the method of forming the index-matching layer 404 may include sputtering, vapor deposition, spray coating, spin coating, or brush coating.

Figure 4:
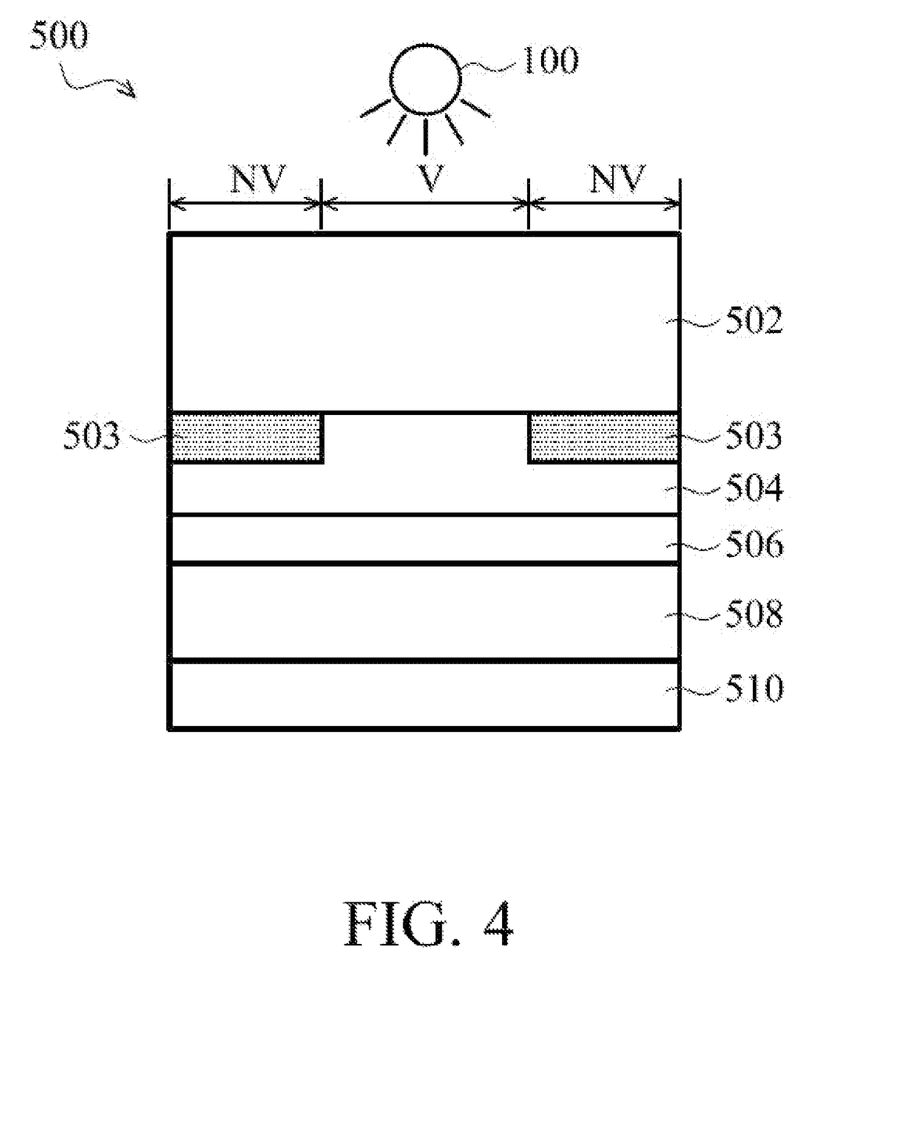
FIG. 4 illustrates a cross-sectional view of a touch panel in accordance with still another embodiment.

Referring to FIG. 4, a cross-sectional view of a touch panel is illustrated in accordance with yet another embodiment. The touch panel 500 of the embodiment is similar to the embodiment of FIG. 3, which also symmetrically disposes the index-matching layer 504 and the optical layer 508 at two opposite sides of the sensing electrode layer 506, except that the shielding element 503 may be disposed between the cover lens 502 and the index-matching layer 504 in the non-visible region NV, the index-matching layer 504 in the non-visible region NV may be disposed between the shielding element 503 and the sensing electrode layer 506, and the index-matching layer 504 in the visible region V is disposed between the cover lens 502 and the sensing electrode layer 506. Put another way, the shielding element 503 of the embodiment may be formed over the bottom surface of the cover lens 502 before the formation of the index-matching layer 504. In other words, the index-matching layer 504 in the visible region V is formed over the bottom surface of the cover lens 502, and the index-matching layer in the non-visible region NV is formed over the bottom surface of the shielding element 503.

Figure 5:
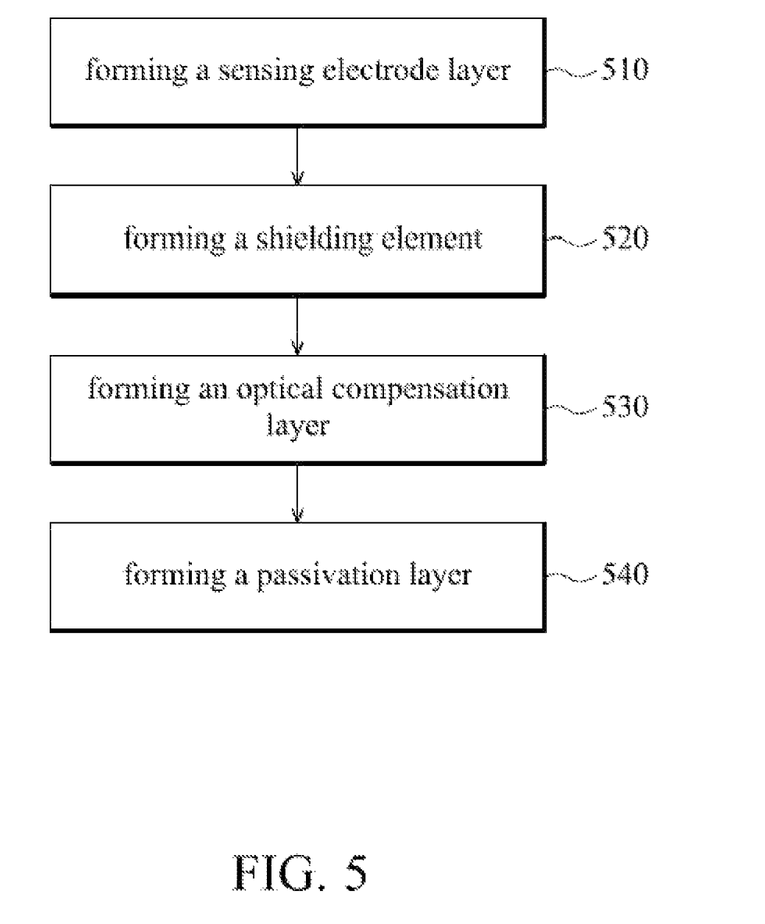
FIGS. 5-8 illustrate the flow charts of the methods for fabricating the touch panels of FIGS. 1A-4, respectively.

Referring to FIG. 5, a flow chart of the method for fabricating the touch panel of FIG. 1A is illustrated. The formation of the sensing electrode layer 206 (step 510), the shielding element 203 (step 520), and the optical compensation layer 208 (step 530) are subsequently performed at a side of the cover lens 202. The method may further include the formation of the passivation layer 210 at step 540. The overall relationship of the structure is illustrated in FIG. 1A, and hence will not be described here to avoid repetition.

Figure 6:
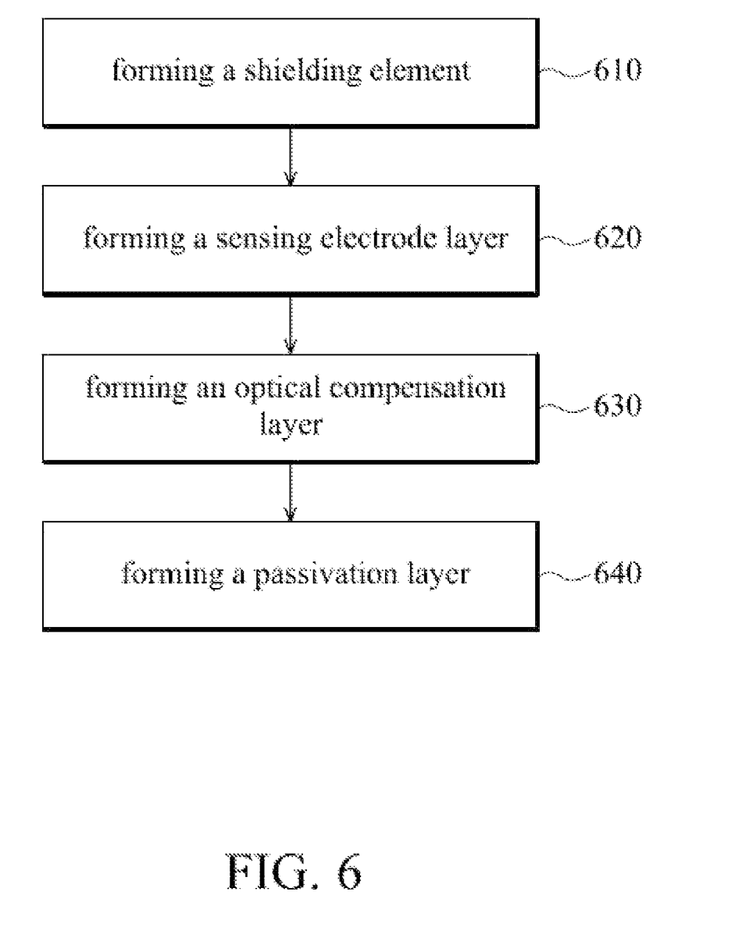

Referring to FIG. 6, a flow chart of the method for fabricating the touch panel of FIG. 2 is illustrated. The formation of the shielding element 303 (step 610), the sensing electrode layer 306 (step 620), and the optical compensation layer 308 (step 630) are subsequently performed at a side of the cover lens 302, and the method may further include the formation of the passivation layer 310 at step 640. In other words, in this embodiment, the shielding element 303 is formed over the bottom surface of the cover lens 302, and then followed by the formation of the sensing electrode layer 306 over the bottom surface of the cover lens 302 and the shielding element 303. After the formation of the sensing electrode layer 306, the optical compensation layer 308 is formed over the bottom surface of the sensing electrode layer 306. The overall relationship of the structure is illustrated in FIG. 2, and hence will not be described here to avoid repetition.

Figure 7:
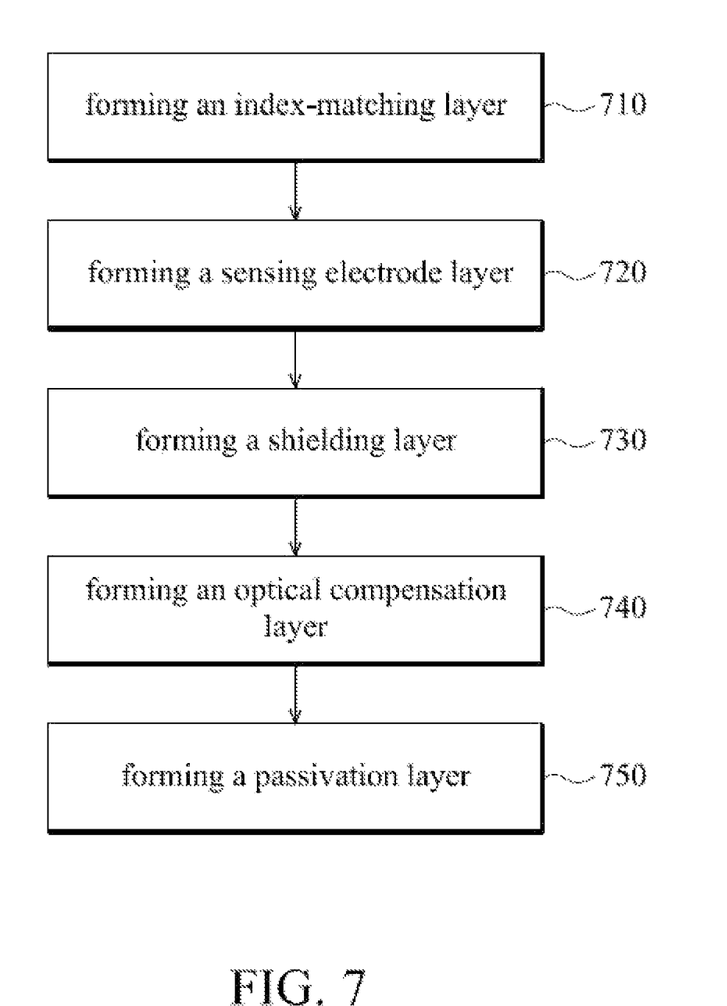

Referring to FIG. 7, a flow chart of the method for fabricating the touch panel of FIG. 3 is illustrated. The formation of the index-matching layer 404 (step 710), the sensing electrode layer 406 (step 720), the shielding element 403 (step 730), and the optical compensation layer 408 (step 740) are subsequently performed at a side of the cover lens 402, and the method may further include the formation of the passivation layer 410 at step 750. The overall relationship of the structure is illustrated in FIG. 3, and hence will not be described here to avoid repetition.

Figure 8:
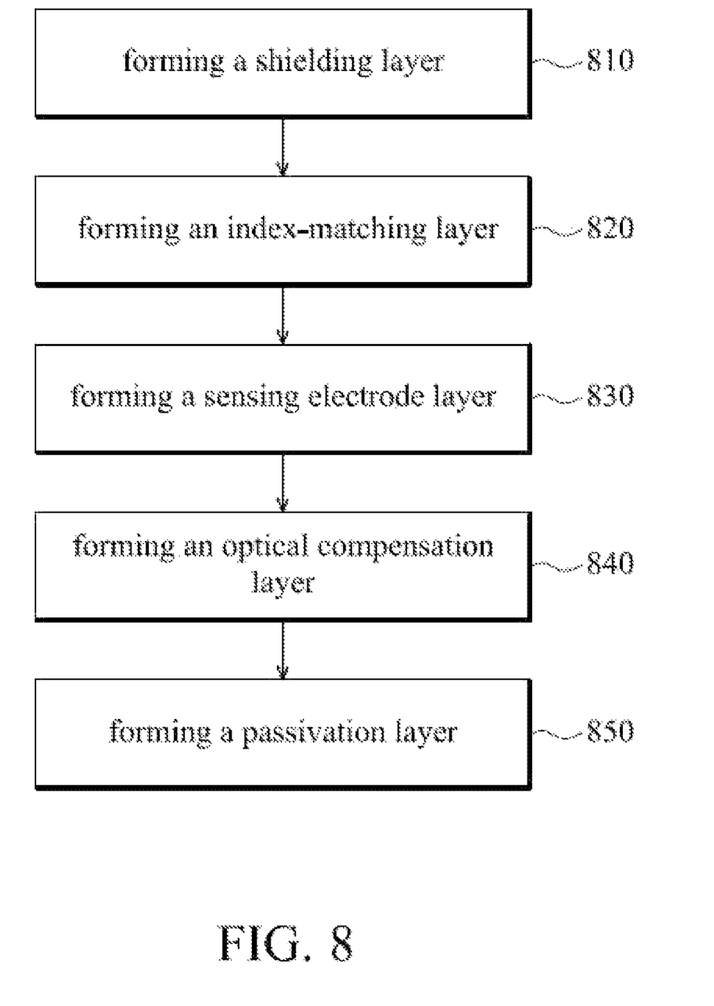

Referring to FIG. 8, a flow chart of the method for fabricating the touch panel of FIG. 4 is illustrated. The formation of the shielding element 503 (step 810), the index-matching layer 504 (step 820), the sensing electrode layer 506 (step 830), and the optical compensation layer 508 (step 840) are subsequently performed at a side of the cover lens 502, and the method may further include the formation of the passivation layer 510 at step 850. The overall relationship of the structure is illustrated in FIG. 4, and hence will not be described here to avoid repetition.

Summarizing the above methods for fabricating touch panels, the steps generally include forming a sensing electrode layer and an optical compensation layer at a side of a cover lens, wherein the sensing electrode layer is disposed between the cover lens and the optical compensation layer. An etching region and a non-etching region are defined on the sensing electrode layer. The optical compensation layer is utilized to form an optical match with the sensing electrode layer; the optical compensation layer receives incident light through the cover lens and the sensing electrode layer to reconcile the hue of the corresponding reflected light formed by the etched and the non-etching region.

The touch panels of the embodiments disclosed above may be further attached with a display assembly (not shown) through an optical adhesive layer (not shown) to form a touch display assembly that can be widely applied to various electronic products. Furthermore, the properties, materials, and methods of formation of corresponding elements disclosed in the embodiments are substantially identical, and are not individually described in each embodiment.

In summary, the design and application of the index-matching layer can avoid the visibility of etch lines, such that obvious patterns will not appear on the touch display when the touch panel is applied to the display assembly. In addition, the optical compensation layer is designed and fabricated in accordance with the optical properties of the sensing electrode layer, which allows the incident light from an external light source outside the touch panel to be reflected into a reflective light similar to the natural light after being transmitted through the sensing electrode layer and the optical compensation layer, thereby solving the problems of light color defect, such as the tendency to be blue or yellow, when the touch panel is observed by observers. Moreover, since the light color defect of the reflective light has been solved, the transmittance of the visible region of the touch panel can be increased accordingly.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, comprising:
   a cover lens;
   an optical compensation layer; and
   a sensing electrode layer between the cover lens and the optical compensation layer, wherein:
     an etching region and a non-etching region are defined in the sensing electrode layer,
     a first portion of a first surface of the sensing electrode layer contacts a first surface of a shielding element,
     a second portion of the first surface of the sensing electrode layer contacts a first surface of the optical compensation layer,
     a second surface of the optical compensation layer contacts a second surface of the shielding element,
     a third surface of the optical compensation layer contacts a third surface of the shielding element,
     an optical match is formed by the optical compensation layer with the sensing electrode layer, and
     the optical compensation layer is configured to receive incident light through the cover lens and the sensing electrode layer to reconcile a hue of reflected light correspondingly formed from the etching region and the non-etching region.

2. The touch panel of claim 1, wherein an area formed by the shielding element defines a non-visible region of the touch panel, and wherein the shielding element is disposed between the sensing electrode layer and the optical compensation layer in the non-visible region.

3. The touch panel of claim 1, wherein an area formed by the shielding element defines a non-visible region of the touch panel.

4. The touch panel of claim 1, wherein the optical compensation layer is a composite layer formed of one or more layers.

5. The touch panel of claim 1, wherein the optical compensation layer is a composite layer formed by alternating a plurality of high-refractivity layers and low-refractivity layers.

6. The touch panel of claim 1, wherein the optical compensation layer comprises glass, $Nb_2O_5$, $SiO_2$, indium tin oxide (ITO), $TiO_2$, or a combination thereof.

7. The touch panel of claim 1, wherein the optical compensation layer is a composite layer comprising a first compensation layer and a second compensation layer, and wherein the first compensation layer is $SiO_2$ and the second compensation layer is $Nb_2O_5$.

8. The touch panel of claim 7, wherein the first compensation layer has a thickness of 5-60 nm and a refractivity of 1.20-1.70, and wherein the second compensation layer has a thickness of 1-15 nm and a refractivity of 1.6-2.5.

9. The touch panel of claim 1, further comprising a passivation layer in contact with the optical compensation layer.

10. The touch panel of claim 1, further comprising an index-matching layer, wherein the index-matching layer and the optical compensation layer are disposed at two opposite sides of the sensing electrode layer.

11. The touch panel of claim 10, wherein a material and a thickness of the index-matching layer is substantially equal to that of the optical compensation layer.

12. The touch panel of claim 10, wherein the index-matching layer is disposed between the cover lens and the sensing electrode layer.

13. The touch panel of claim 12, wherein an area formed by the shielding element defines a non-visible region of the touch panel.

14. The touch panel of claim 10, wherein an area formed by the shielding element defines a non-visible region of the touch panel, and wherein a remaining area of the touch panel defines a visible region.

15. The touch panel of claim 14, wherein the index-matching layer is disposed between the cover lens and the sensing electrode layer in both the visible region and the non-visible region.

16. A method for forming a touch panel, comprising:
   forming a sensing electrode layer at a side of a cover lens;
   forming a shielding element at a side of the sensing electrode layer, wherein a first portion of a first surface of the sensing electrode layer contacts a first surface of the shielding element; and
   forming an optical compensation layer, wherein:
     the sensing electrode layer is disposed between the cover lens and the optical compensation layer,
     an etching region and a non-etching region are defined in the sensing electrode layer,
     a second portion of the first surface of the sensing electrode layer contacts a first surface of the optical compensation layer,
     a second surface of the optical compensation layer contacts a second surface of the shielding element,
     a third surface of the optical compensation layer contacts a third surface of the shielding element,
     an optical match is formed by the optical compensation layer with the sensing electrode layer, and
     the optical compensation layer is configured to receive incident light through the cover lens and the sensing electrode layer to reconcile a hue of reflected light correspondingly formed from the etching region and the non-etching region.

17. The method of claim 16, wherein an area formed by the shielding element defines a non-visible region of the touch panel.

18. The method of claim 17, wherein the optical compensation layer is formed subsequent to the shielding element.

19. The method of claim 17, further comprising forming a passivation layer at a side of the optical compensation layer.

20. The method of claim 16, further comprising:
forming an index-matching layer, wherein the index-matching layer and the optical compensation layer are disposed at two opposite sides of the sensing electrode layer, wherein an area formed by the shielding element defines a non-visible region of the touch panel, and wherein a remaining area of the touch panel defines a visible region.

21. The method of claim 20, wherein the index-matching layer is formed before the sensing electrode layer.

22. The method of claim 20, wherein the index-matching layer contacts the cover lens and the sensing electrode layer.

* * * * *